United States Patent [19]

Shore

[11] Patent Number: 4,547,401

[45] Date of Patent: Oct. 15, 1985

[54] CLEANING OF SURFACE OF AN OBJECT

[76] Inventor: Jack Shore, 4293 Coleridge St., Pittsburgh, Pa. 15201

[21] Appl. No.: 602,980

[22] Filed: Apr. 23, 1984

[51] Int. Cl.$^4$ .................. B05B 5/00; A45B 25/00; C09K 11/06
[52] U.S. Cl. .................... 427/161; 134/29; 134/30; 252/301.21; 252/543
[58] Field of Search .................... 134/29, 30; 252/301.21–301.32, 543; 427/161

[56] References Cited

U.S. PATENT DOCUMENTS

| | | | |
|---|---|---|---|
| Re. 27,890 | 1/1924 | Holbus | 106/10 |
| 3,222,213 | 12/1965 | Clark | 117/119.6 |
| 3,326,814 | 6/1967 | Klaas | 252/301.2 |
| 3,457,109 | 7/1969 | Peist | 134/29 |
| 3,518,099 | 6/1970 | Holbus | 106/10 |
| 3,914,185 | 10/1975 | Inamorato | 252/543 X |

OTHER PUBLICATIONS

*Material Safety Data Sheet*, American Cyanamid Company, No. 620.
*Fluorescent Whitening Agent for Plastics and Coatings*, Ciba–Geigy.
*Tinopal CBS—A Lightfast, Chlorine—Stable Fluorescent Whitening Agent*, Ciba–Geigy.

*Primary Examiner*—Michael R. Lusignan
*Attorney, Agent, or Firm*—Hymen Diamond

[57] ABSTRACT

In the cleaning of the surface of an object, such as an automobile, during which the surface is subjected to a detergent and then rinsed with water and dried by beading, an optical brightener is injected into, or contained in, the detergent and/or the rinsing water and/or the beading material. The inclusion of the optical brightener not only improves the appearance of the cleaned object, giving it luster and causing it to gleam, but also materially accelerates or improves the beading.

12 Claims, No Drawings

CLEANING OF SURFACE OF AN OBJECT

BACKGROUND OF THE INVENTION

This invention relates to the cleaning of the surfaces of objects such as automobiles It has particular relationship to materials used in such cleaning. In the interest of dealing with concrete subject matter, this invention is described herein predominantly in its application to the cleaning of automobiles. This invention is useful in the cleaning of other objects and to the extent that this invention is so used, such use is within the scope of equivalents thereof.

In being cleaned in a typical car wash, an automobile is advanced through a cleaning channel, consisting of stages or steps, where it is subjected to a plurality of cleaning operations in succession. In the first stage, the automobile is passed into a washing arch where it is subjected to washing with a detergent. It is then subjected to brushing or rubbing by a plurality of brushes or mitts disposed to brush its various parts. Alternatively, the automobile may be treated by water or cleaning solutions under pressure in a pressure stage. Then, in a rinsing stage, the automobile is passed into a rinsing arch where it is rinsed by a liquid, usually water where a beading material may be applied, or the automobile is moved into a beading arch where it is washed with water including a beading emulsion. In the last stage, a blasting stage, the beads (of water) are blown off the vehicle surface by a blast of gas, usually air, produced by a blower or blowers in an arch through which the vehicle is advanced. U.S. Pat. No. 3,222,213, Clark, is typical of the prior art with which this invention concerns itself. Clark discloses oil-in-water emulsion formulations which have what is called a "fast water break" manifested by the beading on a surface treated with the emulsion. The automobile is treated in the beading step with this material generally in the quantities and proportions disclosed in Clark or related prior art. Typically, the emulsion is injected into water which is sprayed on the car as it passes through the beading arch.

In cleaning automobiles in accordance with the teachings of the prior art as disclosed above, it has been found that the surface of the automobile may, at times, remain undesirably wet after it is subjected to the blast of air. To remedy this deficiency, automobile-cleaning establishments (car washes) have found it necessary to employ additional personnel to wipe the automobiles after they leave the blasting arch.

It is an object of this invention to overcome this disadvantage of the prior art and to provide a method of cleaning the surface of an object, such as an automobile, in whose practice the surface shall be substantially completely dry after being subjected to the blasting. It is also an object of this invention to provide a beading material for effectuating the drying of the surface of the object during a cleaning operation.

SUMMARY OF THE INVENTION

This invention arises from the realization that the failure in the blasting stage, in the prior art practice, to dry the surface of the automobile completely, results from ineffective or incomplete beading of the rinsing water during the beading step. It is believed that the prior art beading, at times, fails to produce effective beading of the rinsing liquid in the time usually available in the beading stage. It has been discovered that the application to the surface to be cleaned of an optical brightener or bleach improves or accelerates the beading so that the object exits the blasting arch with the liquid on its surface substantially completely dry. In addition, because of the inclusion of the brightener, the surface treated has a highly improved luster and gleam. Optical brighteners are discussed in lines 9 through 39 of Column 4 of Klaas, U.S. Pat. No. 3,326,814 and a number of U.S. and foreign patents relating to brighteners are listed. Among the optical brighteners which have been found to produce satisfactory results in the practice of this invention are: CALCOFLUOR White RWP made by American Cyanamid Co. of Bound Brook, NJ 08805, a coumarin type brightener; Tinopal CBS-X made by Ciba-Geigy of Ardsley, NY 10502, a stilbene derivative; Uvitex OB made by Ciba Geigy, a benzoxazolyl derivative and Tinopal RBS-200 made by Ciba-Geigy, a naphthotriazole derivative.

In the normal practice of this invention, the optical brightener or optical bleach is included as a component of the beading emulsion disclosed by Clark and related prior art which are referred to herein as prior-art beader emulsions. The prior-art beader emulsion is an emulsion predominantly of oil in water; i.e., it has a water phase and an oil phase. The oil phase may also contain wax (See Holbus U.S. Pat. No. 3,518,099). Usually the oil, including wetting and coupling agents, is mixed with water to form the emulsion. Optical brighteners are available which are soluble either in the water phase or the oil phase and a small, but effective, quantity of either or both may be added to the prior-art emulsion. It is desirable that the brightener be dissolved in water or the selected oil and added in solution. Prior solution in oil is particularly essential for the oil soluble optical brightener. It has also been found that a small, but effective, quantity of the optical brightener injected into the detergent and/or the rinsing liquid produces the accelerated beading effect. Instead of being included in the beading emulsion, the optical brightener may also be injected into the spray separately from the beading emulsion.

A surprising phenomenon which has been observed in the practice of this invention is that optical brightener injected into the detergent or the rinsing liquid or injected into, or contained in, the beading emulsion is not rinsed off or lost, but passes through the cleaning cycle and is deposited on the cleaned surface producing improved appearance or luster or gleam which is not produced in the absence of the optical brightener.

Beading materials, in accordance with this invention, having the following formulations have been prepared:

| FORMULA I | |
| --- | --- |
| TOMAH N-4 | 40% |
| Water | 59.8% |
| Tinopal CBS-X | 0.2% |

The Tinopal, which is the optical brightener, is dissolved in some of the water and is added last.

TOMAH N-4 is supplied by Tomah Products, Inc. of 1012 Terra Drive, P.O. Box 388, Milton, WI 53563-0388. The Tinopal CBS-X is supplied by Ciba-Geigy. The TOMAH N-4 is predominantly an oil to which wetting and coupling agents are added.

| FORMULA II | |
|---|---|
| TOMAH N-6 | 40% |
| Water | 59.8% |
| CALCOFLUOR White RWP | 0.2% |

CALCOFLUOR, which is the optical brightener, is dissolved in TOMAH N-6 and then the water is added. Here again, the TOMAH N-6 is an oil to which wetting and coupling agents are added. CALCOFLUOR is a trademark of Cyanamid.

| FORMULA III | |
|---|---|
| Mineral seal oil | 20% |
| Dicocodimethylquaternary - Wetting agent | 10% |
| Ethoxylated Amine - Wetting agent | 5% |
| Nonionic - Wetting agent | 2% |
| Butyl Cellosolve - Coupler | 3% |
| Water | 59.8% |
| Tinopal CBS-X | 1.2% |

The Tinopal is dissolved in some of the water and added last.

| FORMULA IV | |
|---|---|
| Water | 98% |
| Tinopal CBS-X | 2% |

The material of this formulation is added to the prior-art beading emulsion after the prior-art beading emulsion has been diluted to ready it to feed through the beading arch. Typically, the beading emulsion is diluted 10 to 1 with water; e.g., 5 gallons of the prior-art beading emulsion is added to 50 gallons of water. At this stage, about 13 ounces of the material of FORMULA IV is added to the 55-gallon drum of the diluted prior-art beading emulsion. Use of this material in the beading step of a cleaning operation has been found to accelerate or improve the beading materially and to endow the surface of the cleaned automobile with unusual luster.

| FORMULA V | |
|---|---|
| Armogloss AE | 40% |
| Water | 59.8% |
| Tinopal CBS-X | 0.2% |

The Tinopal is dissolved in some of the water and is added last. The Armogloss AE is sold by Akzo Chemie America, 300 South Wacker Drive, Chicago, IL 60606.

The solubility of the Tinopal CBS-X in water in FORMULA III was found to be a little over 0.2% at room temperature and atmospheric pressure. While levels above this have been found to function effectively, the concentrates must be agitated before pouring into the water, thus making it more difficult to handle. Practicality suggests that the limit of solubility of the optical brightener concentrate is the practical limit to use. In the case of FORMULA IV, the limit of solubility is the solubility in water which is about 2.5% at room temperature and atmospheric pressure. The optical-brightener powders can also be added directly to the mixes, but the rate of solution is slow in the emulsions. If the optical-brightener powders or concentrates are added to the detergent stage or the rinse stage, this is not a problem; the function of the brightener is as described above.

EXAMPLE I

Tinopal CBS-X was dissolved to make a concentrate of 2 ounces per gallon in water. 13 ounces of this solution was added to 50 gallons of water. To this mixture was then added 3 gallons of beading emulsion. The beading emulsion consisted of 60 parts of water and 40 parts of TOMAH N-4 in one run and N-6 in a second run. The emulsion containing the Tinopa was then diluted with water through a car wash spray arch and sprayed onto the cars after they had passed through the detergent and rinsing stages. The improved beading effect was immediately apparent as was the added luster. At the point of use injected into the arch, the concentration of bleach was 0.028 grams per liter.

EXAMPLE II

A test was then made with an optical bleach that was oil soluble, namely, CALCOFLUOR WHITE BWP CONCN. Thirty-seven and one-half (37½) grams of CALCOFLUOR WHITE was dissolved in 2 gallons of TOMAH N-6. To this was added 3 gallons of water to make the beading material according to this invention. The material was then diluted: 3 gallons of the material in 50 gallons of water. This material was sprayed onto the cleaned cars through the beading arch. Again, improved luster and accelerated or improved beading effects were observed. The concentration of CALCOFLUOR WHITE in the 55-gallon drum before being applied through the arch was 0.112 grams per liter.

In both EXAMPLE I and EXAMPLE II, the beading material is injected into the water which is sprayed on the object in the beading arch and is highly diluted. It is surprising that, notwithstanding the dilution, the material is not washed out but adheres to the surface of the object so that its properties take effect.

While preferred practice and preferred embodiments of this invention are disclosed herein, many modifications thereof are feasible. This invention is not to be restricted, except insofar as is necessitated by the spirit of the prior art.

I claim:

1. A method of cleaning a surface of an object which comprises subjecting said surface to a detergent solution, thereafter rinsing said surface with a liquid, thereafter subjecting said surface to a beading material to convert the liquid on said surface into beads, and thereafter subjecting said surface to a blast of gas to remove said beads, the said method being characterized by the step of both improving the appearance of the cleaned surface and accelerating the beading by including a small but effective quantity of an optical brightener in one or more of the detergent solution, the rinsing liquid and/or the beading material.

2. The method of claim 1 wherein the small but effective quantity of the optical brightener is injected into the detergent solution.

3. The method of claim 1 wherein the small but effective quantity of the optical brightener is included in the beading material.

4. The method of claim 1 wherein the small but effective quantity of optical brightener is injected into the rinsing liquid.

5. A beading material containing a small but effective quantity of an optical brightener.

6. The beading material of claim 5 including about 0.2% of an optical brightener.

7. In the cleaning of the surface of an object a method of drying said surface after it has been rinsed with a liquid which comprises subjecting said surface to a beading material which includes an optical brightener thereby to accelerate the beading of said liquid and thereafter subjecting said surface to a blast of gas.

8. In the cleaning of the surface of an object by subjecting said object in successive steps to a detergent, a rinsing liquid, a beading material and a blast of gas to remove the beads produced by the beading material, a method of endowing the said surface after it is cleaned with a luster or gleam, the said method comprising the step of introducing a small but effective quantity of an optical brightener during the course of one or more of said steps.

9. The method of claim 1 wherein the quantity of optical brightener included in one or more of the detergent solutions, the rinsing liquid and/or the beading material as a solvent is at most the quantity substantially equal to that to which the solubility of said brightener in the solvent is limited.

10. The method of claim 2 wherein the quantity of the brightener is at most substantially equal to that to which the solubility of said brightener in the detergent solution is limited.

11. The method of claim 3 wherein the quantity of the brightener is at most substantially equal to that to which the solubility of said brightener in the beading material is limited.

12. The method of claim 1 wherein the object is an automobile whose surface is cleaned in a car wash and the detergent solution, the rinsing liquid, and the beading material are sprayed on said surface in liquid form and in each step the sprayed on liquid runs off said surface and notwithstanding, the brightener accelerates the beading and produces added luster of said surface.

* * * * *